(No Model.) 2 Sheets—Sheet 1.
P. W. GATES.
GYRATORY STONE BREAKER.
No. 525,409. Patented Sept. 4, 1894.
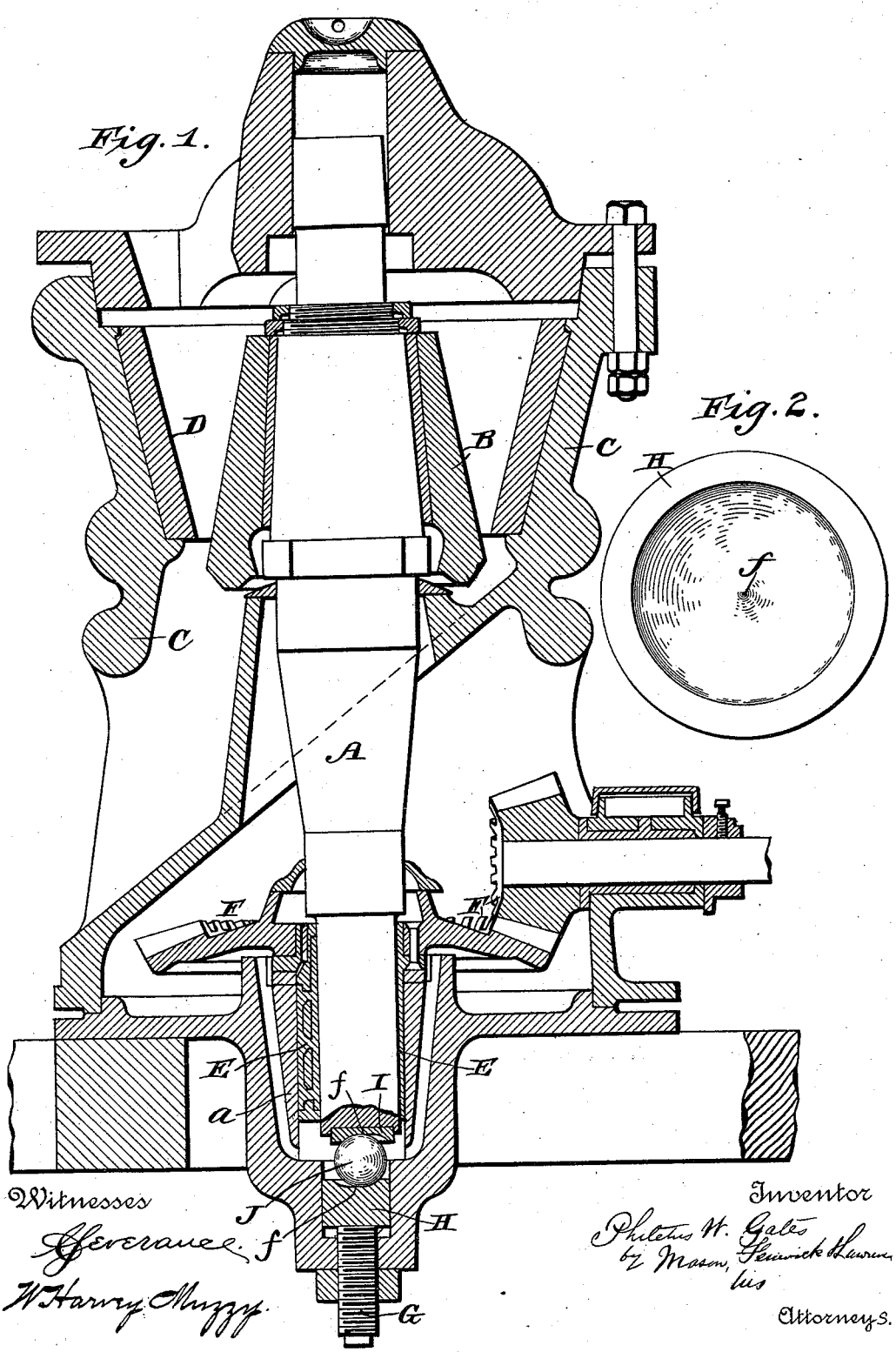

(No Model.) 2 Sheets—Sheet 2.
P. W. GATES.
GYRATORY STONE BREAKER.
No. 525,409. Patented Sept. 4, 1894.
*Fig. 3.* 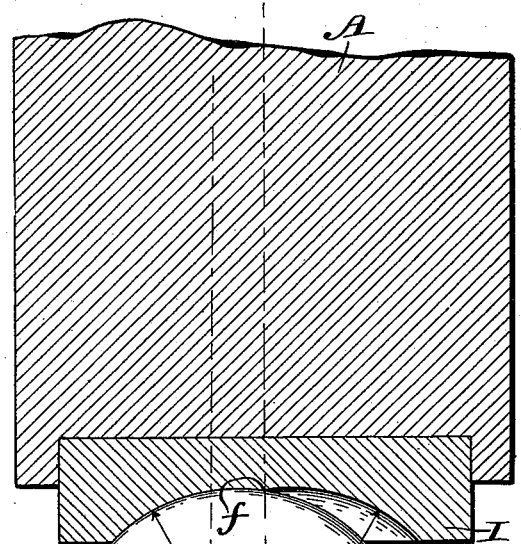 *Fig. 4.* 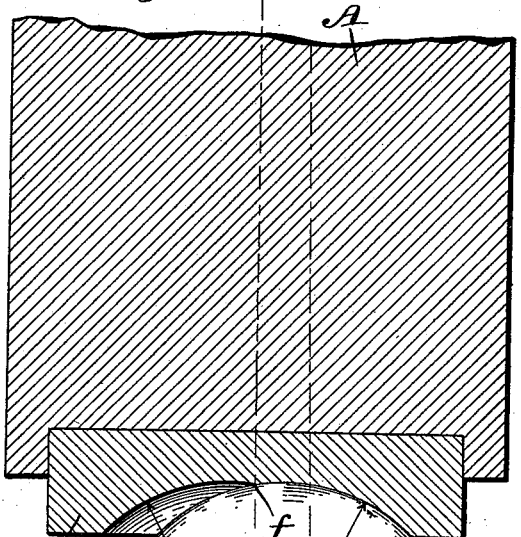
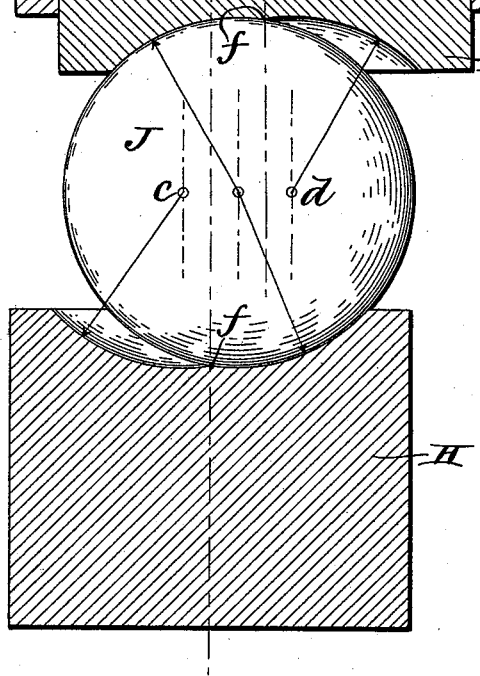 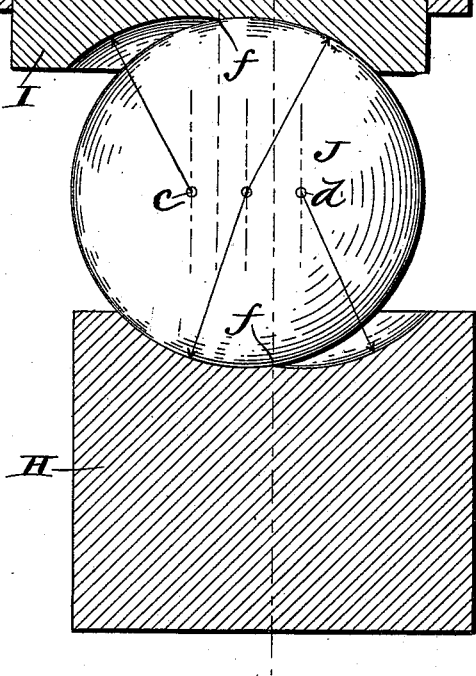
Witnesses
Severance
W. Harvey Muzzy
Inventor
Philetus Warren Gates
by Mason, Fenwick & Lawrence
his
Attorneys

United States Patent Office.

PHILETUS WARREN GATES, OF CHICAGO, ILLINOIS, ASSIGNOR TO THE GATES IRON WORKS, OF SAME PLACE.

GYRATORY STONE-BREAKER.

SPECIFICATION forming part of Letters Patent No. 525,409, dated September 4, 1894.

Application filed November 6, 1893. Serial No. 490,147. (No model.)

*To all whom it may concern:*

Be it known that I, PHILETUS WARREN GATES, a citizen of the United States, residing at Chicago, in the county of Cook and State of Illinois, have invented certain new and useful Improvements in Gyratory Stone-Breakers; and I do hereby declare the following to be a full, clear, and exact description of the invention, such as will enable others skilled in the art to which it appertains to make and use the same.

My invention relates to gyratory shafts for stone breakers and other machines, and its object is to provide for supporting the gyrating shaft on a ball bearing in such a manner that firmness of the shaft and of the crusher head carried by it is secured during the crushing operation or when the greatest resistance is to be sustained; and, also that the wearing surfaces in which the ball travels shall be greatly increased; and also that the minimum of friction shall be experienced during the gyrating of the shaft and revolution of the eccentric box in one direction, and of the shaft and crusher head in the opposite direction.

My invention consists in the combination, as hereinafter described and claimed, with a gyrating shaft and suitable means for gyrating it, of a ball and a bearing cup or cups; said cup or cups having a curved annular valley whose curvature is about equal to the radius of the ball, the radii for said valley being struck from points in the path described by the center of the ball in its gyrations along with the shaft.

My invention also consists in the peculiar construction of the respective bearing cups, whereby the ball is permitted to gyrate with the shaft, in the peculiar manner hereinafter described.

In the accompanying drawings, Figure 1. is a vertical central section of a gyrating stone breaker of a known type with my improvements. Fig. 2. is a plan view of one of the bearing cups. Fig. 3. is a detail vertical section on an enlarged scale showing the shaft and the ball as they appear when the upper bearing cup sustains the downward thrust of the shaft on the left side of the center of the shaft, and the lower bearing cup sustains the ball and shaft on the right side of the perpendicular of the center of the machine, and Fig. 4. is a similar view to Fig. 3. but showing the shaft and ball as they appear when the upper bearing cup sustains the downward thrust of the shaft on the right side of the center line of the gyrating shaft, and the lower bearing cup sustains the ball and shaft on the left side of the perpendicular central line of the machine.

A in the accompanying drawings, designates a gyrating shaft constructed or journaled at its upper end and fitted to work in an upper bearing box in a well known manner; B the crusher head; C a frame or casing; D a concave in which the crusher head works; E an eccentric bearing box fitted to revolve in a tubular bearing *a* formed in the center of the base plate of the frame; and F gearing for revolving the eccentric bearing box. The parts described may be constructed as shown or in any other suitable manner, they not necessarily constituting any part of my present invention although shown as working in connection therewith, and adapted thereto.

In the bottom of the tubular bearing *a* of the base plate of the frame, a lighter-screw G is applied, and on this is mounted a step block or cup bearing H. Instead of having the step block H constructed separately, the screw may be enlarged and the upper end constructed to serve as the lower cup bearing. In the lower end of the gyrating shaft a cup bearing I is applied, and between the lower and upper cup bearings a ball J is located as represented. The upper cup bearing may be formed directly in the shaft, if preferred. If only one of the bearings is employed, the place of the other will be supplied by a plane surfaced support and the ball will revolve upon such plane surface, and in the single cup bearing. The concavity of each of the cup bearings, represented, is peculiarly constructed, so that the ball travels in an annular valley outside of the center of the shaft, and thus a positive rolling and revolving movement of the ball is secured, the axis of the ball always lying about midway between the central inclined line of the shaft and the central perpendicular line of the machine, while the shaft is being gyrated as usual by the eccentric bearing box E.

From the drawings Figs. 3 and 4. it will be seen that the concave surfaces of the upper and lower cup-bearings H, I are struck from the center $b$ of the ball, and from the centers $c$, $d$, which are some distance respectively to one side of said center $b$; and said center $b$ of the ball is represented as about midway between the perpendicular and inclined lines of the machine and shaft, and the centers $c$, $d$, as outside said perpendicular and inclined lines of the machine and shaft. This manner of striking the concave surfaces of the cup bearings forms a very slight apex $f$ in the center, and thus the ball is compelled to travel in its gyrations with the shaft, in an annular valley outside said apex, and by this means a constant firm bearing for the ball, and through it of the shaft, is secured. In the illustrations given in Figs. 1, 3 and 4, the eccentricity of the eccentric box is supposed to be forty-eight one-hundredths and the radii for constructing the valley is supposed to be twenty-four one-hundredths on each side of the center of the respective cups.

It is found in practice that the walls of the cup bearings are always in contact with the ball, or the ball in contact with the walls, and owing to this the wearing surfaces are greatly increased while the capability of withstanding the downward pressure is largely magnified. The lower step is of course stationary while the upper step gyrates with the shaft, according to the eccentric movement imparted to said shaft.

The ball and cups may be constructed of any suitable durable metal. In the operation, the center of the ball under the gyratory action of the shaft, of course, only travels out of the center one half the travel of the periphery.

My construction and arrangement of the cup bearings, whereby a ball can be used instead of toggle joints, as sometimes employed in gyrating crushers, avoids the prying action produced by such toggle joint construction; such not being the case with my construction on account of the ball gyrating bodily with the shaft, and the result is that far less power is required to gyrate the shaft than when the toggle is employed.

What I claim as my invention is—

1. A bearing for a ball, constructed with a curved annular valley bounded by an outer wall and an apex, and whose curvature is about equal to the radius of the ball, the radii for said valley being struck from points in the path described by the center of the ball, substantially as described.

2. In a machine employing a gyrating shaft, the combination with the shaft and suitable means for gyrating it, of a ball and one or two cup bearings which are constructed with a curved annular valley whose curvature is about equal to the radius of the ball, the radii of said valley being struck from points in the path described by the center of the ball, substantially as described.

3. The combination of a gyrating shaft having a cup bearing, constructed with a curved annular valley, attached or applied to its lower end, a ball and a lower stationary cup bearing also constructed with a curved annular valley, substantially as described.

In testimony whereof I hereunto affix my signature in presence of two witnesses.

PHILETUS WARREN GATES.

Witnesses:
HENRY W. HOYT,
ALBERT JUSTIN GATES.